Patented June 21, 1932

1,863,698

UNITED STATES PATENT OFFICE

JOHN F. W. SCHULZE, OF SHAKER HEIGHTS, OHIO, ASSIGNOR TO THE GRASSELLI CHEMICAL COMPANY, OF CLEVELAND, OHIO, A CORPORATION OF DELAWARE

PROCESS OF PURIFYING AND CONCENTRATING ACETIC ACID

No Drawing. Application filed March 28, 1929. Serial No. 350,815.

My invention consists in a process of concentrating and purifying aqueous acetic acid and comprises adding aqueous acetic acid to a ternary mixture of sulfuric acid, acetic acid and water and simultaneously distilling acetic acid therefrom.

The decomposition of gray acetate of lime with sulfuric acid and distillation of acetic acid from the reaction mixture produces crude acetic acid which contains substantially all of the water originally present, both in the acetate and the sulfuric acid, and in common practice an acid of a maximum strength of from 75 to 82% is obtained. This acid is furthermore contaminated with slight amounts of sulfur dioxide, empyreumatic substances and homologues of acetic acid. The so obtained crude acid is unsuited for most technical uses and has to be further purified and concentrated.

The water content of the crude acid can not be reduced by using raw materials of lower water content. The gray acetate of lime contains usually around 15% water, which is to about 10% water of crystallization, the balance being moisture. This technical product can not economically be dried further as it loses its water only at temperatures where decomposition of the acetate into acetone or other products starts to occur. The strongest sulfuric acid which was found to be practically useful is that of about 66° Bé., or about 93%. Higher concentrations are objectionable due to side reactions in the acetate still, such as reduction of the sulfuric acid and oxidation of the gray acetate with consequent lowering of the yield and formation of streams of sulfur dioxide, which not only contaminate the distilling acetic acid, but also exercise a strong corrosive action upon the equipment used.

The process of the present invention is particularly adapted to the concentration and purification of the crude acetic acid obtained by the treatment of gray acetate of lime with sulfuric acid.

The equilibrium between liquid and vapor phase at boiling temperatures and atmospheric pressure of the ternary mixture water—acetic acid—sulfuric acid has been studied by Pascal and his co-workers. (Bull. Soc. Chim. de France, 1922, vol. 29, page 9, etc.). The vapor pressure of sulfuric acid under the conditions where substantial amounts of water and acetic acid are present in the ternary mixture is, for all practical purposes, negligible and can be disregarded.

It was found from Pascal's data that within a certain range of composition of the liquid phase, the concentration of the acetic acid within the vapor phase at boiling temperature is greater than corresponds to the ratio of acetic acid to water contained in the liquid phase. Such compositions of the liquid phase are found within the area of the three coordinate system water-acetic acid—sulfuric acid limited by the 3 points representing the compositions of about 10% water, 10% $H_2SO_4$, 80% acetic acid; 70% water, 20% $H_2SO_4$, 10% acetic acid; and 8% water, 84% sulfuric acid and 8% acetic acid. It appears, for instance, from Pascal's data that a ternary mixture containing 27% acetic acid, 44% sulfuric acid and 29% water, in which the ratio of the acetic acid to water is therefore 48.2% will at the boiling point have a vapor phase containing 70.21% acetic acid.

When aqueous acetic acid is added to a ternary mixture within the above range of composition and which is heated to the boiling point, an acetic acid will distill which is of a higher concentration than the acid added. When this addition is continued the ternary mixture will gradually absorb water, change its compositon, and decrease its power of absorbing water; the concentration of the distilling acid will consequently decrease until a point is reached where the ternary mixture is unable to absorb any further water and the added and distilling acetic acid will be of the same concentration.

I found that when crude acetic acid as obtained directly from an acetate still is added to such a ternary mixture a great deal, if not most of the impurities contained in the crude acid are either decomposed or retained in the ternary mixture. Substantially no decomposition of the acetic acid takes place in the boiling ternary mixture.

Such crude acid can be added in liquid form to the ternary mixture. It is, however, more convenient to pass the acid vapors coming from the acetate still directly into sulfuric acid of a strength around 66° Bé. or stronger. This can be done in a bubbling tank or the acetic acid vapors and the sulfuric acid can be contacted in an absorption tower through which the sulfuric acid is circulated. Initially there will be complete absorption of the crude acetic acid and formation of the ternary mixture. The absorption heat is sufficient to bring said mixture to the boiling temperature. Heat can, of course, be supplied to the ternary mixture to speed up the distillation and compensate for heat radiation losses. As explained above, a point will be reached where the distilling acetic acid will have the same concentration as the incoming vapors, or the acetic acid, added in liquid form. Due to the action of the sulfuric acid upon the impurities contained in the crude acetic acid, the distilling acid will, however, be purer than the crude acid and it will be available for many technical uses. Empyreumatic and other tar-like substances will accumulate in the ternary mixture which will, from time to time have to be discarded and replaced by fresh, strong sulfuric acid.

The amount and strength of the sulfuric acid used can be varied within wide limits, but to insure a substantial purification effect it is advisable to provide for a ternary mixture containing around 65 to 75% sulfuric acid.

I have further found that this process can be improved by keeping the ternary mixture constantly at a composition where the concentration of the acetic acid in the vapor phase is greater than the ratio of acetic acid to water in the liquid phase and where both are greater than the concentration of the acetic acid added to the ternary mixture.

This improved process is applicable to acetic acid in liquid or vapor form and both to crude acid obtained directly from an acetate still or dilute acids from any other source.

When it is desired to concentrate dilute acetic acid vapors I can use a scrubbing tower in which a ternary mixture circulates in counter flow with the acetic vapors; concentrated acetic acid is obtained at the top of the tower and a more dilute ternary mixture overflows at the bottom. From this latter I distill out an aqueous acid more dilute, but purer than the original acid and which can be used for various purposes where such acid is desired. This distillation is conducted to the point where the ternary mixture has the requisite strength for concentrating the crude vapors and it is then continuously reintroduced at the top of the tower until too much of tarry impurities have accumulated therein. It will be understood that in this manner the dilute crude acetic acid vapors are continuously contacted with fresh portions of a ternary mixture of substantially constant composition.

A more convenient manner of keeping the ternary mixture used to dehydrate dilute acetic acid at a composition where the concentration of the acetic acid in the vapor phase is greater than the ratio of acetic acid to water in the liquid phase, consists in adding strong sulfuric acid thereto and removing therefrom an amount of said mixture containing substantially the same amount of $H_2SO_4$ as added. The concentration of the sulfuric acid to be added must be greater than the ratio of $H_2SO_4$ to water in the ternary mixture. The addition of the sulfuric acid to and removal of the excess ternary mixture from the reaction zone is best done in a continuous flow.

This improved modus operandi is again applicable to dilute acetic acid in liquid as well as vapor form and both to crude acetic acid obtained directly from an acetate still or to dilute acids from any other source.

I can use various types of equipment in which to perform my novel process. A spray or absorption tower filled with the usual filling material is, for instance, very convenient when operating on gaseous acetic acid. The ternary mixture and sulfuric acid are preferably preheated, mixed and introduced at the top of the tower where the concentrated acetic acid vapors are also eliminated, and then condensed in the usual way. The total of the ternary mixture overflows at the bottom. Its composition is so controlled that it is within the limits specified above. This ternary mixture is then run into a tank from where a part is pumped back into the top of the tower, the balance to overflow and to to be used for any other purpose as desired. The vapors of crude or dilute acetic acid are introduced at the bottom or at an intermediate height of the tower.

Another type of equipment which has successfully been used in performing my novel process consists in a mixing or bubbling tank. This is equipped with a mechanical agitator, steam jacket or other heating device, siphon overflow and contains the ternary mixture; fresh sulfuric acid and acetic acid, in liquid or vapor form are introduced near the center of the kettle where they are immediately and intimately mixed with the ternary mixture. The concentrated acetic acid distills out and the excess, or spent ternary mixture runs through the overflow. The overflow of spent ternary mixture obtained by operating in the above manner can be treated to recover dilute, purified acetic acid and concentrated sulfuric acid therefrom, which latter is then returned into the cycle of operation. I prefer to use the spent ternary mixture when operating my improved process in connection with a gray acetate of lime still for the decomposition of the acetate. The amount of feed acid in the scrubber can be adjusted to correspond to the acid needed in the decomposition operation and no additional sulfuric acid is then required.

It is obvious that in this last procedure the final acetic acid distillate will contain all the water introduced into the system, both that originating in the gray acetate as that of the feed acid. In using 66° Bé. acid, which is the highest concentration that can be used in prior practice, there will be no concentration in the acetic acid production over prior processes, though, as explained above, the acid obtained will be of greater purity.

It will now be understood that in feeding 66° acid into the scrubber, the concentration of the spent ternary mixture to be used in the acetate still will be of lower concentration. Due to this I can use a feed acid stronger than 66° acid and therefore introduce less water into the system, consequently obtain a final acetic acid of correspondingly higher concentration. Taking monohydrate, i. e., 100% sulfuric acid, as the feed acid, the final acetic acid will only contain the water originally present in the gray acetate. Using oleum of various concentrations such as for instance 104% sulfuric acid, even part of this latter water can be absorbed. Complete elimination of the water and production of 100% acetic acid is impractical, as a certain amount of water in the reaction still is required to prevent undesirable side reactions.

The spent ternary mixture which I use in this preferred embodiment of my novel process for the decomposition of the gray acetate, can immediately be returned to the acetate still and the process in this manner developed into a continuous one. I can also store said spent ternary mixture from a batch operation and add it to the gray acetate in a subsequent operation. It will be understood that a certain amount of acetic acid is withdrawn in the spent ternary mixture from the final distillation, but as this is returned to the acetate still, it is merely circulating in a closed cycle and substantially no decomposition or loss of acetic acid occurs. The use of such a ternary mixture in the acetate still has the additional advantage that the acetic acid contained therein acts as a kind of inert diluent and facilitates the contact between the sulfuric acid and the acetate.

While my novel process is particularly adapted for work under atmospheric pressure, similar conditions will obtain under reduced or super-atmospheric pressures. The equilibrium conditions between acetic acid plus water in the vapor phase and the ratio of acetic acid to water in the ternary mixture acetic acid—sulfuric acid-water will vary with the pressure and my process will have to be adjusted accordingly.

The following is a description of my novel process for the production of purified and concentrated acetic acid direct from gray acetate of lime:

600 pounds of gray acetate of lime are charged in a usual direct fired acetate still. To this is added in the course of about half an hour 514 pounds of ternary mixture recovered from a preceding operation and having a composition of 15.5% acetic acid, 75.2% sulfuric acid and 9.3% water. Heat is applied and acetic acid distills out, the crude vapor having an approximate and average concentration of 76.3% acetic acid. This vapor is introduced into a kettle or bubbling tank containing a similar ternary mixture; simultaneously and gradually an amount of sulfuric acid of a concentration of 104.5% is run into said kettle. The total amount of sulfuric acid used is 370 pounds, and its addition is distributed over the total time acetic acid distills out of the reaction still. The bubbling tank is fitted with an overflow, so that the volume in the kettle remains constant. As sulfuric acid is added the ternary mixture overflows from the bubbling tank, which spent ternary mixture has approximately the same composition as the one specified above. Total amount of ternary mixture of about 514 pounds is obtained. The bubbling tank is equipped with a heating device and acetic acid is distilled out in the usual way. Its concentration is about 83.2% and the total amount obtained is about 440 pounds. The so obtained acetic acid is substantially free from tarry and empyreumatic substances.

I claim:

1. In a process of purifying and concentrating acetic acid comprising contacting aqueous acetic acid with a ternary mixture of acetic acid—sulfuric acid—water of a composition within the range of compositions in which, at the boiling point, the concentration of the acetic acid in the vapor phase is greater than the ratio of acetic acid to water in the liquid phase, the steps of distilling acetic acid from the contacting zone, removing spent ternary mixture from said contacting zone and supplying to said contacting zone sulfuric acid, acetic acid and water in amounts requisite to maintain the ternary mixture in said contacting zone within the limits of said composition.

2. In a process of distilling acetic acid the steps comprising adding aqueous acetic acid to a ternary mixture of acetic acid—sulfuric acid—water of a composition within the range of compositions in which, at the boiling point, the concentration of the acetic acid in the vapor phase is greater than the ratio of acetic acid to water in the liquid phase, maintaining the composition of the said ternary mixture within said limits of composition by constantly supplying concentrated sulfuric acid to the contacting zone, constantly removing exhausted ternary mixture and constantly removing vapors of concentrated acetic acid from the contacting zone.

3. The process of claim 2 in which the sulfuric acid added to the contacting zone is of a strength of about 104%.

4. In a process of purifying and concentrating acetic acid comprising contacting aqueous acetic acid with a ternary mixture of acetic acid—sulfuric acid—water of a composition within the range of compositions in which, at the boiling point, the concentration of the acetic acid in the vapor phase is greater than the ratio of acetic acid to water in the liquid phase, the steps of distilling acetic acid from the contacting zone, removing spent ternary mixture from said contacting zone, distilling dilute acetic acid from said removed spent ternary mixture and returning so regenerated ternary mixture to the said contacting zone.

5. In a process of distilling acetic acid the steps comprising adding aqueous acetic acid to a ternary mixture of acetic acid—sulfuric acid—water of a composition within the range of compositions in which, at the boiling point, the concentration of the acetic acid in the vapor phase is greater than the ratio of acetic acid to water in the liquid phase, adding sulfuric acid of a strength greater than 66° Bé., to said ternary mixture while maintaining it within the limits of said composition, withdrawing from the reaction zone such amounts of the ternary mixture as containing substantially the same amount of sulfuric acid as added and concurrently distilling acetic acid from the ternary mixture remaining in the reaction zone.

In testimony whereof, I affix my signature.

JOHN F. W. SCHULZE.